Nov. 6, 1956     N. M. OUGLAND     2,769,274
CRAB TRAPS
Filed Feb. 4, 1952     2 Sheets-Sheet 2

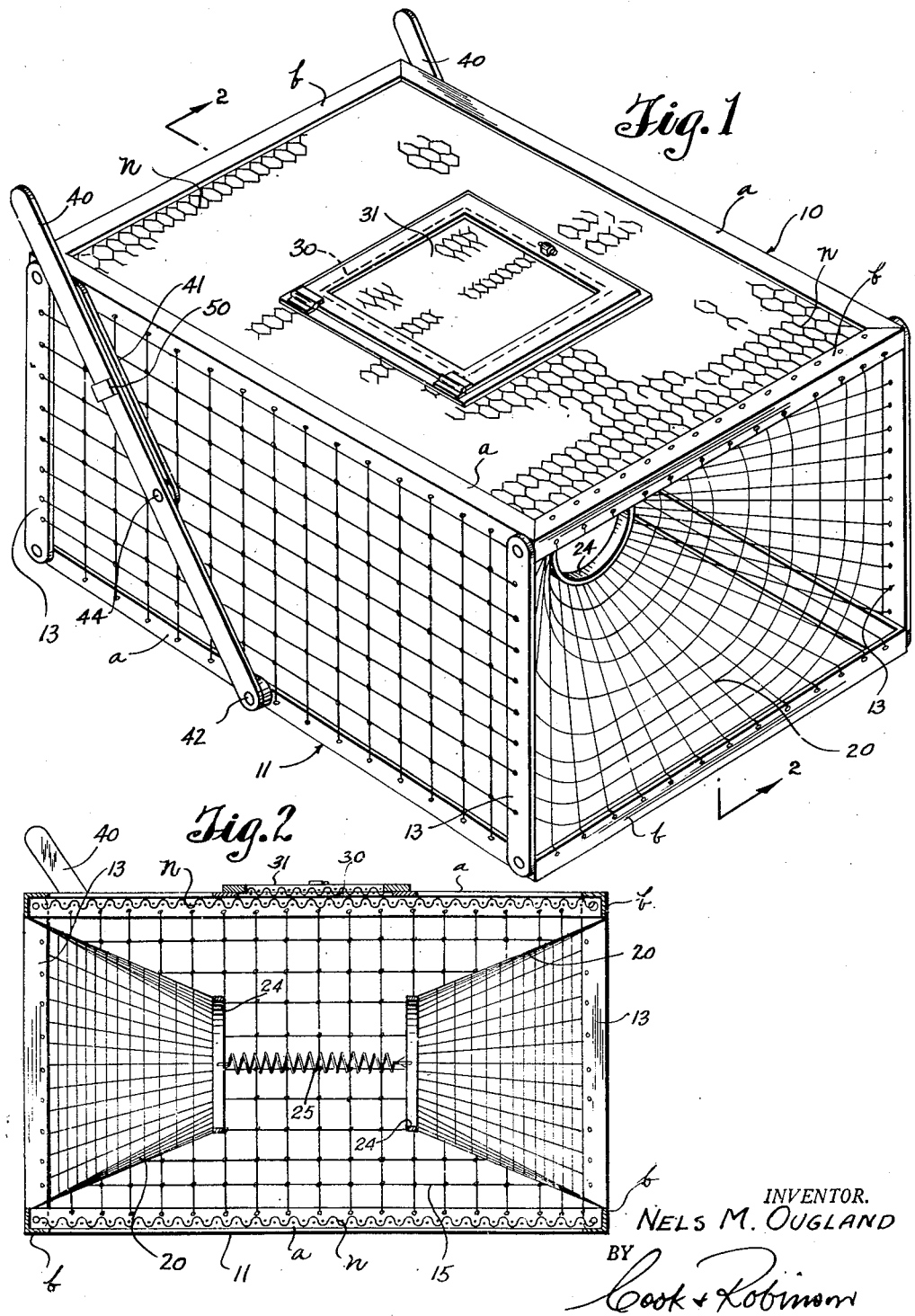

INVENTOR.
NELS M. OUGLAND
BY
Cook & Robinson
ATTORNEYS.

United States Patent Office 2,769,274
Patented Nov. 6, 1956

2,769,274
CRAB TRAPS

Nels Martin Ougland, Bellingham, Wash.

Application February 4, 1952, Serial No. 269,697

1 Claim. (Cl. 43—105)

This invention relates to crab traps, and it has reference more particularly to traps that are designed for use in the commercial trapping of crabs and which are adapted to be collapsed when not in use for storage on board ship or in warehouse space; it being the principal object of the invention to provide sturdy and long lasting traps, with wall forming sections that are so constructed, and hingedly joined that they may be easily and readily collapsed substantially flatly together, and also easily and quickly erected ready for use.

It is also an object of the invention to provide a trap with hingedly joined wall sections adapted to be substantially flatly collapsed together and to be adjusted from collapsed to erected condition, by means of a novel form of toggle linkage, which also serves as a means for locking the parts of the trap against collapse when erected.

Another object of the present invention is to provide a trap with tunnels leading thereinto from its opposite end walls, and which tunnels are joined by springs that are maintained under tension, thus to hold the tunnels in functional position when the trap is erected, and to prevent entanglement when the trap is collapsed.

Other objects of the invention reside in the details of construction and combination of parts embodied in the trap, and in the mode of use of the trap as will hereinafter be described.

In accomplishing the above mentioned and other objects of the invention, I have provided the improved details of construction, the preferred form of which is illustrated in the accompanying drawings, wherein—

Fig. 1 is a perspective view of a crab trap embodying the improvements of the present invention therein.

Fig. 2 is a central, longitudinal section of the trap, taken in a vertical plane on the line 2—2 of Fig. 1.

Referring more in detail to the drawings:

In its present preferred form of construction, the trap is of rectangular, box-like form as seen in Fig. 1. In a practical size, it would be about forty inches long, thirty inches wide, and eighteen inches high. It is to be understood, however, that these dimensions are not critical and the trap might be made larger or smaller according to desires or requirements, without departing from the invention.

Figure 3:
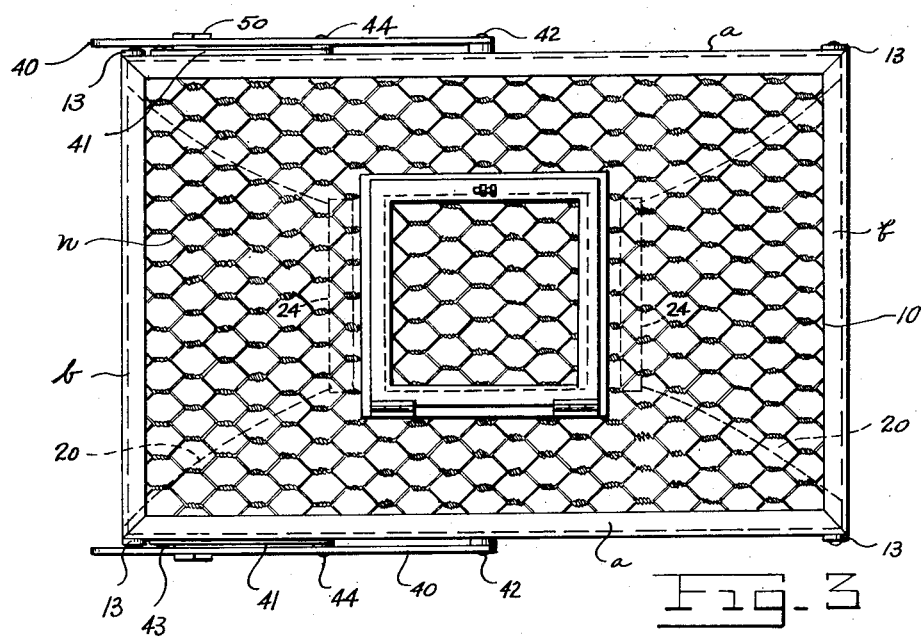
Fig. 3 is a top view of the erected trap.

The trap comprises horizontally disposed top and bottom wall sections, 10 and 11, of rectangular form and of the same size. Each section comprises parallel opposite side rails a, a, and opposite end rails b, b, preferably of angle iron, and rigidly joined; each section as thus formed is covered with wire netting n of suitable mesh for the purpose, in the manner shown in Figs. 2 and 3; the netting being secured to the rails a, a, and b, b, and drawn taut.

Figure 4:
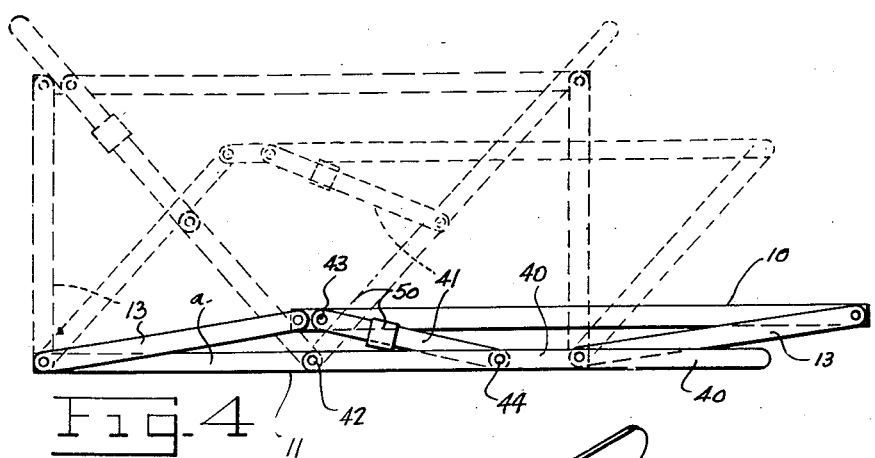
Fig. 4 is a side view of the frame of the trap as collapsed for storage showing different positions of the frame in dotted lines.
Figure 5:
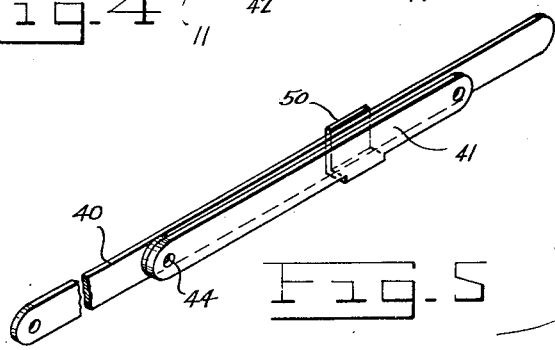
Fig. 5 is a perspective view of one of the toggle lever mechanisms for erecting and locking the trap in erected condition.

The top and bottom wall sections 10 and 11 are joined in spaced relationship, as shown in Fig. 2, by corner posts 13; these posts all being of the same length and each is pivoted at its upper and lower ends, respectively, to the ends of the side rails of the sections 10 and 11 so that the top wall section can be moved endwise for collapsing the trap, as from the dotted line position in Fig. 4 to the lower, full line position, in which latter position it is disposed, close to and parallel with the bottom section. The means for effecting this adjustment of wall sections will presently be more fully described.

The opposite sides of the box-like structure that is provided by the erection of frame members, are covered with cord netting 15; the ends of the cord being applied through small holes in the frame members and secured thereto. Cord netting instead of wire mesh is employed in order to provide for easy and ready collapsing and erecting of the trap without causing strain on or damage to the netting. When the trap is adjusted from a collapsed condition, as in Fig. 4, to the erected condition of Fig. 1, the cord netting draws tightly to position.

The opposite ends of trap structure are partially closed by the tunnels 20 and 20, each of which is attached at its outer and larger end to the rectangular end structure that is defined by the horizontal end rails of the top and bottom sections, and the two adjacent corner posts. The tunnels are made of woven cord and taper inwardly, and at their inner ends are attached to metal rings 24 which hold them open. The rings of the two tunnels are spaced apart but are joined by a pair of coiled springs 25, 25, thus to keep the tunnels drawn taut and fully open when the trap is erected. When the trap is adjusted from the open position of Fig. 1 to the closed position of Fig. 4, the tunnels will flatten out and the rings are caused to move to a close, horizontal relationship between the wire mesh walls of the top and bottom wall sections. When the trap is adjusted from collapsed to erected position, the tunnels automatically assume the position and relationship of Figs. 2 and 3.

An opening 30 is provided in the top wall section 10 for removal of crabs from the trap and this is normally closed by a wire mesh panel 31 that is hinged thereto to open and can be secured closed by any suitable means.

For the erection and securement of the trap and the securement of its parts in erected position, I have provided a toggle lever mechanism at each side of the trap, each mechanism comprising an elongated lever 40 and a shorter link 41. The lever 40 is pivoted at its lower end, as at 42, to the side rail of the bottom section about mid-way of its ends. The relatively short lever 41 is pivoted at one end to the end portion of the corresponding side rail a of the top wall section, as at 43, and at its other end is pivoted as at 44, to lever 40. The lever mechanisms are opposite each other, and their attachment is such that by the swinging of the long levers 40 from dotted line position of Fig. 4, to the full line position, the top and bottom walls will shift endwise relative to each other and the frame structure will be caused to be collapsed. Likewise, by swinging the levers in the opposite direction the trap will be erected. Furthermore, in swinging the levers 40 upwardly to effect erection of the trap, they will ultimately then engage stop ears 50 turned outwardly from the latter, thus to hold the levers in this locking position. The levers 40 may then be further secured against release if desired.

This trap can be easily and readily collapsed and erected; the collapsing being effected without damage to or undue strain on the netting which covers the side walls. Such traps can be made in various sizes and are easily handled.

The main advantage in the collapsing of the trap is the reduction of space occupied thereby. This makes it possible to store four traps in the space of one erected trap.

Having thus described my invention, what I claim as new therein, and desire to secure by Letters Patent, is:

A crab trap of rectangular box-like form comprising a top wall section having oppositely disposed side rails and oppositely disposed end rails defining said top wall, a bottom wall section having oppositely disposed side rails and oppositely disposed end rails defining said bottom wall, links connecting corresponding corner portions of the top wall section and the bottom wall section to hold them in spaced relationship when the trap is erected, and pivoted thereto for swinging in the same direction for movement of said sections toward each other for the collapsing of the trap, flexible cord netting attached to the side rails of the top and bottom sections and to the links to form the side walls of the trap, woven cord tunnels applied to the opposite ends of the trap, each tunnel having its larger end attached to the links and end rails of the top and bottom sections at the corresponding end of the trap, thus to partially close the ends of the trap, said tunnels terminating in spaced relationship at their inner ends, and each having a rigid ring defining the open inner end of said tunnel, coiled springs extended between and attached under tension to said rings to draw the tunnels taut and retain them open when the trap is erected, and diagonally directed toggle linkage joining the side rails of top and bottom wall sections and adapted, in one position of adjustment to retain the trap in its erected position and manually movable to another position of adjustment to cause the trap to be collapsed; and one link of said toggle linkage being extended as an actuating handle for the adjustment of the linkage from one position to another.

References Cited in the file of this patent

UNITED STATES PATENTS

| Number | Name | Date |
|---|---|---|
| 354,846 | Walker | Dec. 21, 1886 |
| 544,100 | Hurst | Aug. 6, 1895 |
| 639,628 | Thomsen et al. | Dec. 19, 1899 |
| 860,506 | Williams | July 16, 1907 |
| 997,123 | Franklin | July 4, 1911 |
| 1,122,524 | Marcum | Dec. 29, 1914 |
| 1,183,791 | Arakawa | May 16, 1916 |
| 1,445,763 | Gibbs et al. | Feb. 20, 1923 |
| 2,552,007 | Griffith | May 8, 1951 |

FOREIGN PATENTS

| Number | Country | Date |
|---|---|---|
| 553,021 | France | Feb. 2, 1923 |
| 752,607 | France | July 24, 1933 |